United States Patent [19]
Clare

[11] 3,900,087
[45] Aug. 19, 1975

[54] BRAKE RELEASED ACCELERATOR HOLDER

[75] Inventor: Michael A. Clare, Toledo, Ohio

[73] Assignee: Sidcor, Inc., Toledo, Ohio

[22] Filed: Mar. 25, 1974

[21] Appl. No.: 454,408

[52] U.S. Cl. .............................................. 192/3 T
[51] Int. Cl.² ......................................... B60K 29/02
[58] Field of Search ................................... 192/3 T

[56] References Cited
UNITED STATES PATENTS

| | | | |
|---|---|---|---|
| 2,846,035 | 8/1958 | Heath | 192/3 T |
| 2,948,369 | 8/1960 | Arpin | 192/3 T |
| 2,979,172 | 4/1961 | Eshbaugh et al. | 192/3 T |
| 3,386,542 | 6/1968 | Cummings | 192/3 T |
| 3,417,836 | 12/1968 | Thorner | 192/3 T X |
| 3,439,783 | 4/1969 | Graham et al. | 192/3 T |

*Primary Examiner*—Benjamin W. Wyche
*Attorney, Agent, or Firm*—Owen & Owen Co.

[57] ABSTRACT

An apparatus for maintaining a constant accelerator setting in a vehicle is disclosed. The apparatus is actuated by pulling a dash-mounted control rod outwardly to a position beyond a spring-operated stop member. A member connected by screw threads to the control rod is linked to the accelerator pedal, so that fine adjustments to the accelerator setting may be made by rotation of the control rod. Application of the brake pedal disengages the stop member from the control rod, which disables the cruise control and releases the accelerator. The accelerator may be reset at its former setting by again pulling out the control rod.

4 Claims, 6 Drawing Figures

3,900,087
PATENTED AUG 19 1975
SHEET 1 OF 2
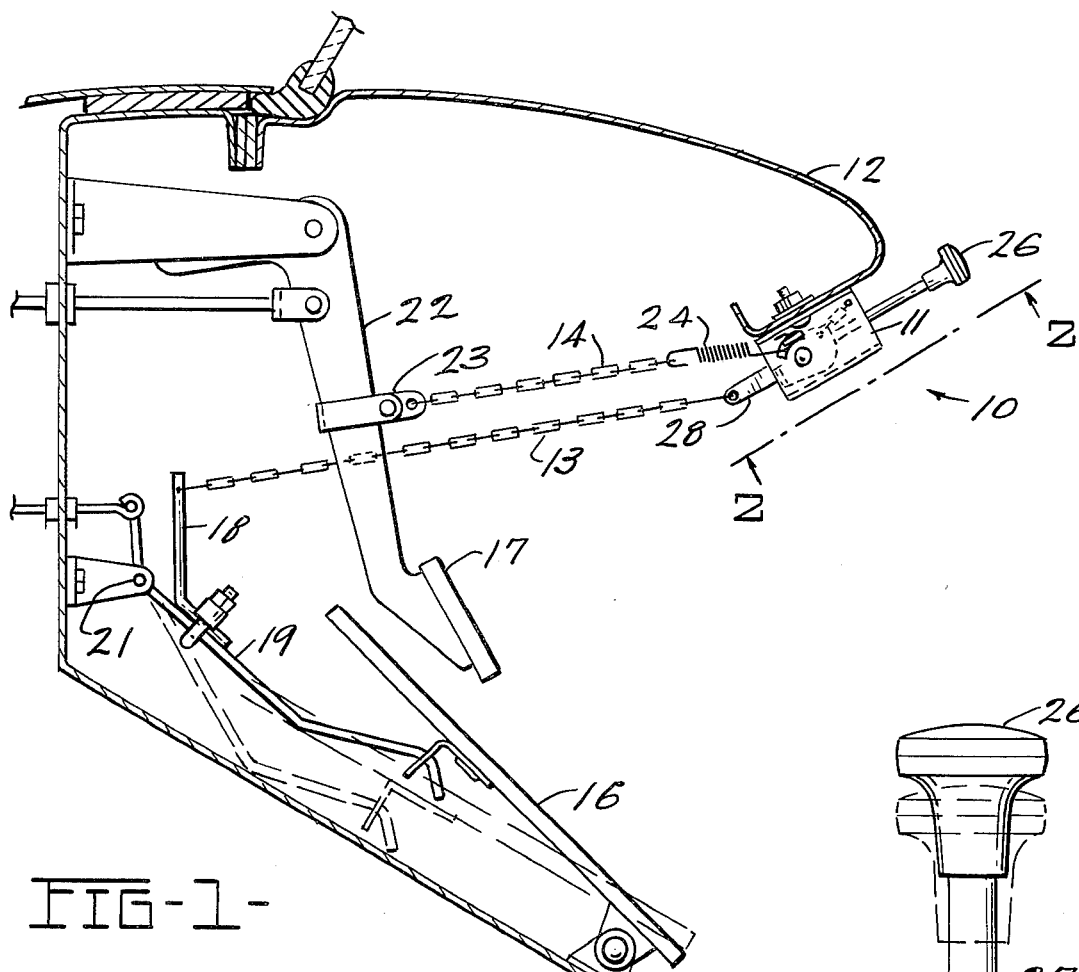
FIG-1-
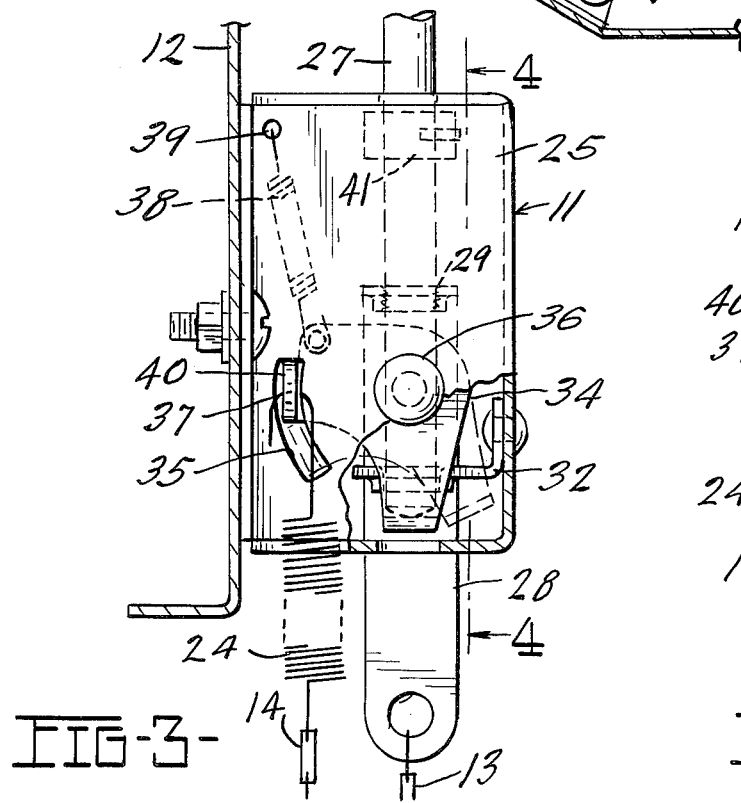
FIG-3-
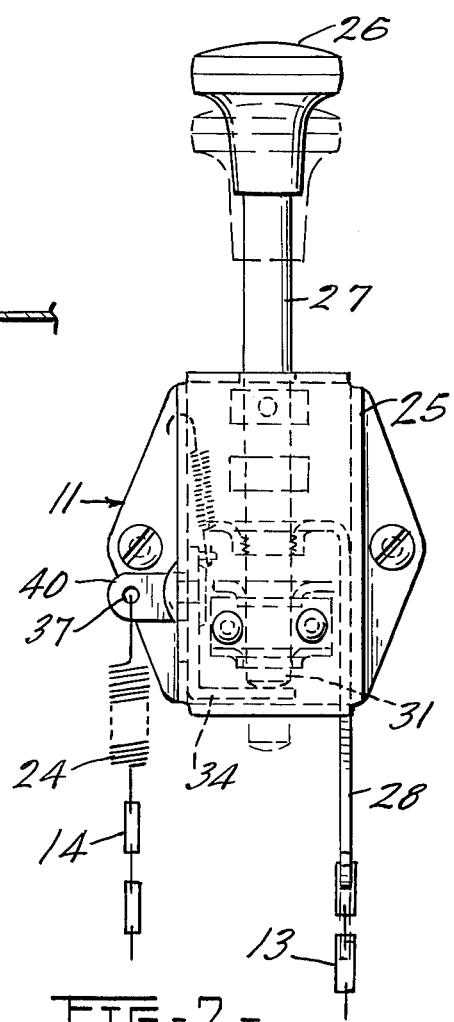
FIG-2-

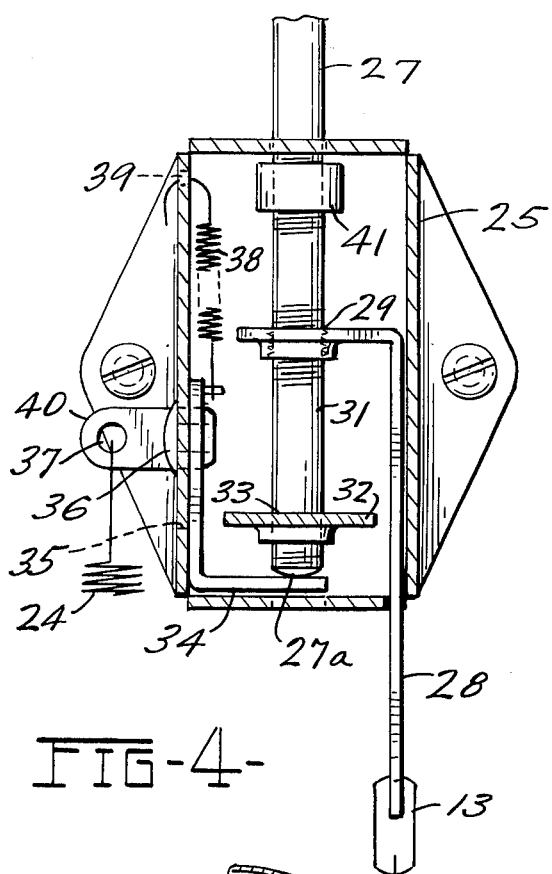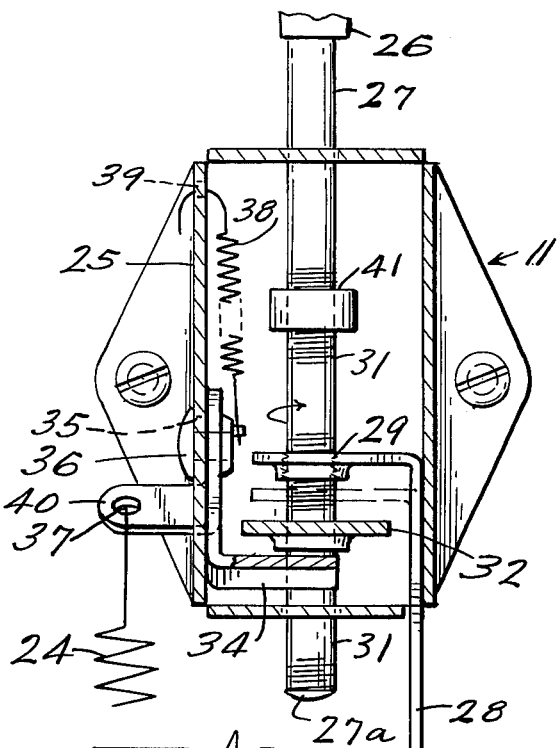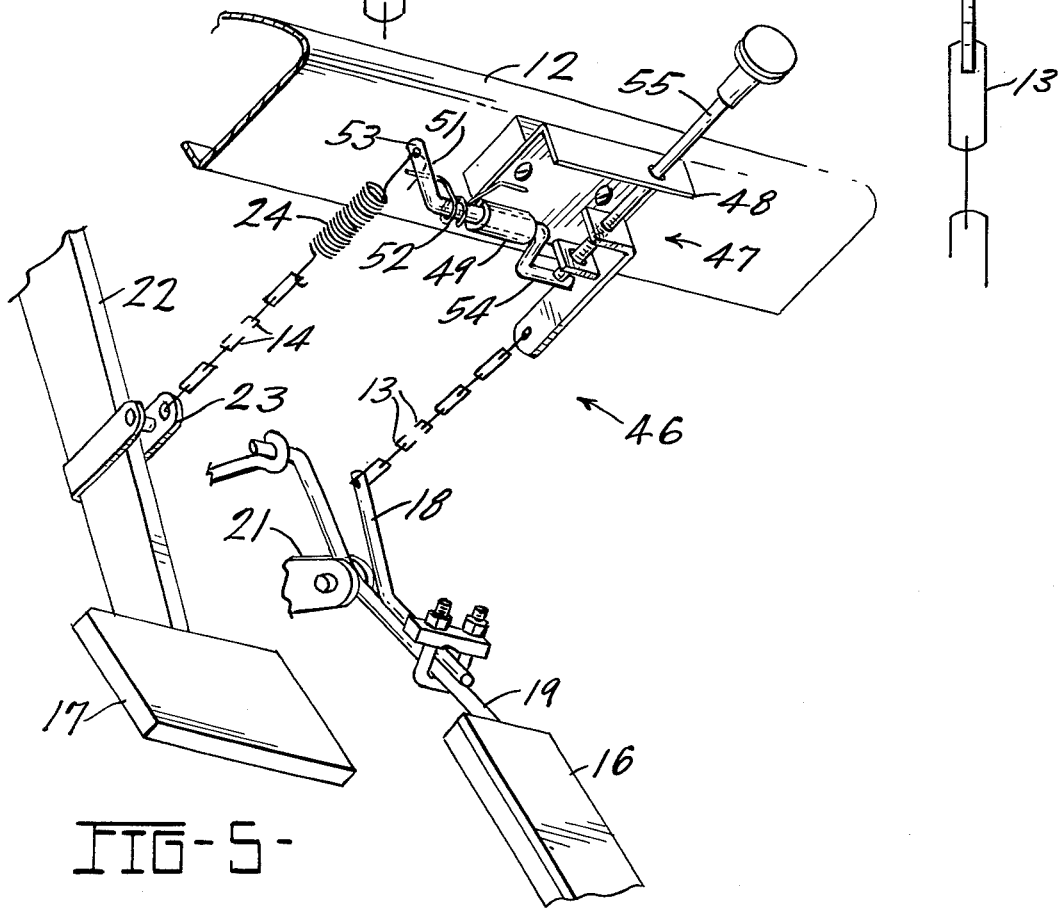

BRAKE RELEASED ACCELERATOR HOLDER

BACKGROUND OF THE INVENTION

The invention relates to apparatus for maintaining a constant throttle setting in an automobile, and more particularly to a brake-releasable accelerator holding device. Such devices are commonly referred to as cruise controls.

Mechanical cruise control or throttle-holding devices having release means connected to the brake pedal are known. See, for example, U.S. Pat. Nos. 2,853,164, 2,948,369, 2,979,172 and 3,417,836. Such cruise control devices are intended to allow a driver to set the throttle at a chosen level, maintaining substantially constant vehicle speed and allowing him to rest his foot and leg during sustained non-stop driving.

U.S. Pat. Nos. 2,853,164 and 3,417,836 show devices having positive connections between the accelerator linkage and a portion of the brake-releasable control apparatus, such that after release of the control apparatus, any depression of the accelerator to the previous locked-in level will again lock in that accelerator setting. The present invention constitutes an improvement over these prior art devices.

SUMMARY OF THE INVENTION

The mechanical cruise control device according to the present invention is simple and compact and easily installed and operated, as well as economical to manufacture. The device can be attached and operated on virtually any automobile having an accelerator and a brake pedal.

The cruise control of this invention includes a rotatable control knob connected to a threaded or screw shaft on which a correspondingly threaded linkage bar advances or retracts with rotation of the shaft. The linkage bar is connected by a tension line to a lever member connected to the accelerator pedal in such a way that upward pulling on the end of the lever will advance the accelerator pedal position. The end of the screw shaft rests on a movable abutment which is spring-biased toward its position supporting the end of the screw shaft. The movable abutment member is connected to the brake pedal so that a slight application of the brake will remove the abutment member out from under the end of the screw shaft, allowing the screw shaft and linkage member to be pulled inwardly under the influence of the accelerator linkage spring of the vehicle. This places the cruise control device in its inoperative position wherein both the accelerator and brake are released and may be fully controlled by the driver in the normal way.

Reactivation of the cruise control at the former throttle setting is accomplished by pulling the control knob and screw shaft outwardly toward the driver far enough to allow the spring-biased abutment to be urged into its former position under the end of the screw shaft. The accelerator setting may again be finely adjusted by rotating the control knob in one direction or the other. The accelerator pedal may at any time be further depressed to add additional power on hills, for example, without deactivating the cruise control. If less power is desired momentarily, the driver need only touch the brake pedal to deactivate the device.

Since tension lines are used in the present cruise control to connect the brake and accelerator pedals to the device, the cruise control in its released position does not reactivate with depression of the accelerator pedal, regardless of how far the pedal is pushed. The cruise control is reactivated only by outward pulling of the control knob. In addition, the use of tension lines results in another safety feature. In a head-on collision, the dash and fire wall of an automobile are often brought closer together. Since the cruise control of this invention employs no compression members connected to the accelerator or brake pedals, the device cannot cause jamming of the accelerator to a high level or sudden locking of the brake during such a collision.

BRIEF DESCRIPTION OF THE DRAWINGS

FIG. 1 is a side elevational view of a mechanical cruise control according to the invention, shown connected to the under edge of the dash of a vehicle and linked to the accelerator and brake pedals;

FIG. 2 is a view of the control apparatus taken along the line 2—2 of FIG. 1;

FIG. 3 is an enlarged view of the control apparatus as seen in FIG. 1;

FIG. 4 is a sectional view taken along the line 4—4 of FIG. 3;

FIG. 4A is a sectional view similar to that of FIG. 4 but indicating the control apparatus in its inoperative position; and FIG. 5 is a perspective view of a modified form of the cruise control device.

DESCRIPTION OF THE PREFERRED EMBODIMENTS

In the drawings, FIG. 1 shows a mechanical cruise control, generally indicated by the reference number 10, in operation in a vehicle. A control apparatus 11 of the cruise control 10 is mounted to the underside of the dash 12 of the vehicle. Tension chains 13 and 14 connect the control 11 with the accelerator pedal 16 and brake pedal 17, respectively. The accelerator chain 13 is not connected to the accelerator 16 directly, but rather is linked to an extending bar 18 in this embodiment. The extending bar 18 is mounted on a portion of the accelerator linkage 19 just below the linkage pivot point 21 which is provided on nearly all automobiles, so that the bar 18 extends above the pivot point 21. The brake tension chain 14 may be connected to the lever arm 22 of the brake pedal 17 by a strap 23 as shown in FIG. 1 or by any other adequate fastening means. At the other end of the brake tension chain 14 is a tension spring 24 which provides a lost motion connection between the brake lever 22 and the control apparatus 11. This allows the brake pedal 17 to be depressed to any extent necessary without limitation or hindrance by the tension chain 14. The operation of the spring 24 with respect to the control 11 will be more fully explained below.

The control apparatus 11 of the mechanical cruise control 10 is shown in greater detail in FIGS. 2, 3, 4 and 4A. Extending from a housing 25, a control knob 26 mounted on the end of a rotatable screw shaft 27 is connected to the accelerator tension chain 13. This control knob 26 provides for setting the accelerator 16 at a constant level and for finely adjusting the accelerator setting by rotation of the control knob 26 in one direction or the other.

The linkage of the screw shaft 27 to the accelerator chain 13 is best understood by viewing FIGS. 4 and 4A. A linkage member 28 has a threaded bore 29 which engages threads 31 of the screw shaft 27. Farther down the screw shaft 27 a brace 32 projected from the housing 25 has an enlarged flared opening 33 through which the screw shaft 27 passes. An abutment link 34 attached to the housing 25 by a pivotal connection 36 provides a backup for the end 27a of the screw shaft 27, which is biased against the abutment link 34 by the vehicle's accelerator return spring (not shown) when the chain 13 is in tension, as shown in FIG. 4. Thus, in the position shown in FIG. 4, rotation of the screw shaft 27 in one direction will advance the linkage member 28 on the shaft 27 to increase the accelerator setting, while rotation in the other direction will lower the position of the linkage member 28 on the shaft 29 to decrease the accelerator setting.

FIG. 4A shows the control apparatus 11 of the cruise control 10 in its inoperative position, wherein the accelerator 16 may be freely operated in the normal manner. The abutment link 34 has been pivoted out from under the end 27a of the screw shaft 27, allowing the vehicle's accelerator return spring to pull the accelerator chain 13, the linkage member 28 and the screw shaft 27 downward, leaving the accelerator chain 13 in a slackened condition. The end 27a of the shaft 27 is preferably rounded to an arc corresponding to the radius of motion of the abutment link 34, so that outward pivoting of the link 34 from its engaged position will not slightly increase the accelerator position before release of the cruise control 10. The manner in which the abutment link is pivoted to deactivate the cruise control 10 is best understood by viewing FIGS. 3, 4 and 4A.

FIG. 3 shows the connection of the lost-motion brake spring 24 with the abutment link 34. The connection is at a point 37 on an arm 40 laterally offset from the pivot point 36. An arcuate slot 35 in the housing 25 provides limits to the rotational movement of the link 34. Opposing the pivotal rotation of the abutment link 34 is a small spring 38 of lower spring constant than the spring 24. The small spring 38 extends between a housing connection 39 and the arm 40 of the abutment link 34, biasing the link 34 toward its position underneath and supporting the end 27a of the screw shaft 27. The length of the brake chain 14 between the brake lost-motion spring 24 and the brake lever 22 is adjusted so that it is nearly taut, with the spring 24 unextended, in the operative position shown in FIGS. 3 and 1. Thus, when the brake pedal 17 is just slightly pushed, the chain 14 pulls on the spring 24, overcoming the smaller spring 38 and pivoting the abutment link 34 to its inoperative position. shown in FIG. 4A. The cruise control 10 is then inoperative and both the accelerator pedal 16 and the brake pedal 17 may be operated normally without any influence of the cruise control device 10.

In the inoperative position of the control apparatus 11 as shown in FIG. 4A, the abutment link 34, biased towards its operative position by the small spring 38, lightly engages the lower threads 31 of the screw shaft 27. This provides a damping effect on the axial motion of the screwshaft, preventing unintended movement of the rod toward its operative position. Such movement could otherwise occur by vibration or inertia, for example, during periods when the device is in its inoperative position and the accelerator is being manually depressed. The light contact between the shaft 27 and the abutment link 34 during release of the device does not cause thread wear problems since the involved threads are generally lower on the shaft 27 than those used to control the position of the linkage member 28.

Referring again to FIGS. 4 and 4A, when the cruise control 10 is to be reactivated, the control knob 26 is pulled outward from the position of FIG. 4A until the end 27a of the screw shaft 27 clears the abutment link 34, allowing the link 34 to be urged by the small spring 38 to its position under the end of the shaft 27, as seen in FIG. 4. A stop collar 41 affixed to the screw shaft 27 provides a limit to the amount the shaft 27 may be pulled during this operation.

In operation of the mechanical cruise control 10, when the driver of the vehicle desires to maintain a constant accelerator setting, he first pulls out the control knob 26 and shaft 27 to activate the cruise control 10 as described above. The driver than adjusts the accelerator position to a desired level by rotating the control knob 26 clockwise or counterclockwise. If the driver encounters an uphill grade and wishes to add more power to keep his constant speed, he can override the cruise control 10 by simply depressing the accelerator further, slackening the accelerator chain 13. The cruise control 10 will remain in its operative mode and will continue to maintain the desired constant speed when the vehicle again reaches level road and the driver again takes his foot off the accelerator pedal. If the vehicle reaches a downhill grade and the driver does not wish to exceed his former constant speed, or there is other reason for temporarily slowing down, the driver need only lightly touch the brake pedal and the cruise control 10 will immediately become completely inoperative. Of course, the driver may apply as much pressure as needed to the brake pedal 17, since the lost-motion spring 24 is included between the brake chain 14 and the control apparatus 11. To regain the same constant accelerator setting after a temporary slow-down, the driver again pulls the control knob 26 outwardly. The former setting remains, since the knob 26 has not been rotated.

FIG. 5 illustrates a somewhat modified form of the control apparatus 11 of the cruise control 10. The cruise control 46 of FIG. 5 includes an accelerator chain 13, a brake chain 14, a brake spring 24, a brake lever strap 23 and an accelerator linkage extending bar 19 identical to that of the above described embodiment. A dash-mounted cruise control apparatus 47 functions in exactly the same way as the control apparatus 11 above, but its mechanism is slightly modified. A base 48 provides a pivot 49 for an abutment link 51 which comprises an angled piece of bar stock. A torsion spring 52 mounted on the abutment link 51 and engaging the base 48 and an arm 53 of the abutment link serves the same purpose as the small tension spring 38 described above. A second arm 54 of the abutment link 51 provides a backup for the screw shaft 55. In operation, the control apparatus 47 functions in the same manner as that of the control apparatus 11 described above.

Improvements and further embodiments suggested by the above described preferred embodiments will be apparent to those skilled in the art and may be made without departing from the spirit and scope of the following claims.

I claim:
1. A cruise control device for vehicles comprising:
a stationary base mounted within the vehicle;

a rotatable and axially translatable control rod supported by said base, said control rod including screw threads and a handle;

an abutment member pivotally connected to said base and having a flange extending under that end of the control rod opposite the handle, providing a backup against axial movement of the control rod in one direction;

a linkage member in threaded engagement with the control rod and positioned for axial movement along the control rod in response to rotation of the control rod;

a tension line connecting the linkage member with the accelerator linkage of the vehicle such that advancement of the linkage member along the control rod in a direction opposite said one direction will advance the accelerator position and movement of the linkage member in said one direction will allow retraction of the accelerator position under the influence of the accelerator return spring of the vehicle;

a tension line having a tension spring therein connecting a lateral arm of the abutment member with the brake pedal of the vehicle for pivoting the backup flange of the abutment member out from its backup position against the end of the control rod in response to movement of the brake pedal; and a second spring of lower spring constant than the tension line spring, said second spring being disposed between the base and the lateral arm of the abutment member for biasing the abutment member flange toward its backup position.

2. A cruise control device for vehicles comprising:

a stationary base mounted within the vehicle;

a rotatable and axially translatable control rod supported by said base, said control rod including screw threads and a handle;

an abutment member pivotally connected to said base and having a flange extending under that end of the control rod opposite the handle, providing a backup against axial movement of the control rod in one direction;

a linkage member in threaded engagement with the control rod and positioned for axial movement along the control rod in response to rotation of the control rod;

a tension line connecting the linkage member with the accelerator linkage of the vehicle such that advancement of the linkage member along the control rod in a direction opposite said one direction will advance the accelerator position and movement of the linkage member in said one direction will allow retraction of the accelerator position under the influence of the accelerator return spring of the vehicle;

a second tension line connecting a lateral arm of the abutment member with the brake pedal of the vehicle for pivoting the backup flange of the abutment member out from its backup position against the end of the control rod in response to movement of the brake pedal; and biasing means connected to the base and to the abutment member flange for urging the abutment member flange toward its backup position.

3. A cruise control device for vehicles, comprising:

a stationary base mounted within the vehicle;

a rotatable and axially translatable control rod supported by said base, said control rod including screw threads;

a movable abutment member pivotally connected to the base and providing a backup against axial movement of the control rod in one direction;

a linkage member in engagement with the threads of the control rod and positioned for axial movement along the control rod in response to rotation of the control rod;

a tension line connecting the linkage member with the accelerator linkage of the vehicle such that advancement of the linkage member along the control rod in a direction opposite said one direction will advance the accelerator position and movement of the linkage member in said one direction will allow retraction of the accelerator position under the influence of the accelerator return spring of the vehicle;

a second tension line operably connecting the brake pedal of the vehicle to the abutment member for removing the abutment member from its backup position against the control rod in response to movement of the brake pedal; and a spring operably connected to the abutment member and the base, said spring urging pivotal movement of the abutment member toward its backup position adjacent the control rod.

4. A cruise control device for vehicles, comprising:

a stationary base mounted adjacent the dash within the vehicle;

a rotatable and axially translatable control rod supported by said base, said control rod including screw threads and a handle;

an abutment member connected to the base and having a flange extending under that end of the control rod opposite the handle, supporting the control rod against axial movement in one direction, said abutment member being retractable from its position in support of the control rod in a direction transverse to the orientation of the control rod;

means biasing the abutment member toward its position in support of the control rod;

a linkage member in engagement with the threads of the control rod and positioned for axial movement along the control rod in response to rotation of the control rod;

a tension line connecting the linkage member with the accelerator linkage of the vehicle such that advancement of the linkage member along the control rod in a direction opposite said one direction will advance the accelerator position and movement of the linkage member in said one direction will cause retraction of the accelerator position; and a second tension line operably connecting the brake pedal of the vehicle to the abutment member for retracting the abutment member from its position in support of the control rod in response to movement of the brake pedal.

* * * * *